United States Patent [19]

Jackson et al.

[11] 3,907,696

[45] Sept. 23, 1975

[54] NEW HEAT TRANSFER AGENTS

[75] Inventors: Larry L. Jackson; Walter F. Seifert; Daniel E. Collins, all of Midland, Mich.

[73] Assignee: The Dow Chemical Company, Midland, Mich.

[22] Filed: May 3, 1971

[21] Appl. No.: 139,882

[52] U.S. Cl. .................................. 252/73; 252/67
[51] Int. Cl. ............................................. C09k 3/02
[58] Field of Search .......... 252/73, 52 R, 59, 67–69; 260/612 R

[56] References Cited
UNITED STATES PATENTS

| | | | |
|---|---|---|---|
| 1,882,809 | 10/1932 | Grebe | 252/67 |
| 2,149,789 | 3/1939 | Rittler et al. | 252/73 |
| 2,169,995 | 8/1939 | Coleman et al. | 252/65 |
| 2,170,809 | 8/1939 | Coleman et al. | 260/612 R |
| 2,172,391 | 9/1939 | Krase | 252/73 X |
| 2,324,784 | 7/1943 | Lieber | 252/59 |
| 2,933,450 | 4/1960 | Lyding | 252/73 |
| 3,006,852 | 10/1961 | Barnum et al. | 252/73 X |
| 3,475,115 | 10/1969 | Glass et al. | 252/73 X |
| 3,567,783 | 3/1971 | Brown | 252/73 X |

OTHER PUBLICATIONS

Mullin, Crystallization, London, Butterworths & Co., 1961, pp. 83–84.
Handbook of Chemistry and Physics, 31st Ed., Chemical Rubber Publishing Co., 1949, p. 2396.
Hacka's Chemical Dictionary, 4th Ed., McGraw-Hill Book Co., 1969, p. 571.

*Primary Examiner*—Ralph S. Kendall
*Assistant Examiner*—Harris A. Pitlick
*Attorney, Agent, or Firm*—Chessie E. Rehberg

[57] ABSTRACT

New heat transfer agents containing at least three components consisting of by volume 5 to 90% of diphenyl oxide, 5–50% of biphenyl and 5 to 90% of polyphenyl ether having 3 or 4 aromatic nuclei, alkylated biphenyl or diphenyl oxide having 1–4 methyl or ethyl substituents, ethylbenzene oil and mixtures thereof have been discovered.

2 Claims, No Drawings

NEW HEAT TRANSFER AGENTS

BACKGROUND OF THE INVENTION

The ideal characteristics of a heat transfer agent employed in most applications include a broad temperature range of liquidity and a high thermal stability. A number of heat transfer agents are known in this market, but there is a continuing search for better heat transfer fluids.

Giolito et al. in U.S. Pat. No. 3,429,816 show the use of mixtures of phenoxydiphenyls, diphenoxybenzenes and terphenyls as heat transfer agents. It is also shown by Rittler et al. in U.S. Pat. No. 2,149,789 that mixtures of biphenylyl phenyl ethers and acyldiphenyl ethers are desirable heat transfer agents. Hammann et al. in U.S. Pat. No. 3,575,863 show various polyphenyl ethers as heat transfer fluids.

Most if not all of the components of the heat transfer fluids of the present invention are known. For example, the eutectic mixture of biphenyl and diphenyl oxide is sold under the trademark Dowtherm A, and Krase in U.S. Pat. No. 2,172,391 shows the use of alkylated diphenyl. The alkylated diphenyls alone, however, have undesirable thermal stability. The use of the particular combination of fluids in the present invention, however, is not known, nor is the special desirability of these fluids as heat transfer agents and functional fluids known from the art.

SUMMARY OF THE INVENTION

It has now been discovered according to the present invention that heat transfer agents containing at least three components consisting of by volume about 5 to about 90% of diphenyl oxide, about 5 to about 50% of biphenyl and about 5 to about 90% of polyphenyl ether having three or four aromatic nuclei, alkylated biphenyl or diphenyl oxide having 1–4 methyl or ethyl substituents, ethylbenzene oil and mixtures thereof are superior heat transfer fluids. These fluids have a wide range of liquidity while at the same time retaining desirable thermal stability characteristics.

The diphenyl oxide and biphenyl components of the fluids of the invention, of course, are well known. The other fluids which may be utilized in the heat transfer media are not as well known. These fluids are herein defined as follows.

The polyphenyl ethers of the invention are diphenoxybenzene and di(phenoxyphenyl)oxide, i.e., those having three or four benzene nuclei. The relative positioning of the linkage of these compounds is not critical, and the phenyl rings may be in the o, p. or m position to each other.

The alkylated biphenyls and diphenyl oxides are known and may have one to about four methyl or ethyl substituents in any position on the ring structure. These fluids have a boiling range of about 500° to about 800°F.

The "ethylbenzene oil" is the high boiling by-product from the preparation of ethylbenzene and diethylbenzene by the alkylation of benzene with ethylene in the presence of a Friedel-Crafts catalyst. Such fractions are highly alkylated aromatic compounds. The ethylbenzene oil consists of molecules having two phenyl rings and about four to about 10 alkyl carbon atoms, which are usually found as ethyl substituents or linkages, a molecular weight of about 200–270 and a boiling range of about 625° to 750°F. at atmospheric pressure.

The proportions of the components of the heat transfer fluid may vary widely so long as each component is present in the amounts specified. In preferred compositions, about 30 to about 70% by volume of the mixture is diphenyl oxide and biphenyl, with those fluids containing about 40 to about 60% by volume of diphenyl oxide and biphenyl being especially preferred because of their desirable low temperature characteristics and good thermal stability. Of special interest in the present invention are those compositions where the diphenyl oxide and biphenyl are present in the proportion of the eutectic mixture.

The new heat transfer fluids are used in the same manner as known fluids. They, however, have advantages over the known fluids because of their broader range of liquidity and good thermal stability. This advantage permits the use of the fluid under more adverse conditions of temperatures without taking special precautions. For example, the fluids of the invention are suitably used in outside conduits during winter, whereas fluids having a higher freezing point cannot be used or can only be used when the conduit is warmed to prevent freezing.

In addition to a lower freezing point, the fluids of the invention usually exhibit a higher boiling point with good thermal stability. This characteristic results in a lower vapor pressure at given temperatures for the compositions of the invention. This lower vapor pressure is advantageous because the pressure in the heating system is lower, thus the equipment need not be designed to withstand higher pressures and the work required for maintenance and leak prevention is reduced.

In addition to their desirability as heat transfer fluids, the compositions of the present invention are also suitable for use as lubricants and as hydraulic fluids. The wide temperature range of liquidity of the present fluids allows such use when the fluid must withstand extremes of cold and extremes of heat in a particular application.

Representative properties and compositions of the fluids of the invention are shown in the Specific Embodiments.

SPECIFIC EMBODIMENTS

Mixtures of diphenyl oxide, biphenyl and various third components were prepared in the proportions shown in the tables below. Table I shows the properties of the base components of the fluids and the remaining tables show the surprisingly low freezing points of the fluids of the invention. The boiling points of each mixture of the invention is above 500°F. Since these boiling points are in an acceptable range, no boiling point data for the fluids are given.

TABLE I

Comparative Examples of the Components of the Base Fluids

| Example | Fluid | Freezing Pt., °F. | Boiling Pt., °F. |
|---|---|---|---|
| Comp. A | Diphenyl Oxide | 77 | 495 |
| Comp. B | Biphenyl | 158 | 493 |
| Comp. C | Dowtherm A* | 54 | 495 |
| Comp. D | Di(phenoxyphenyl)ether | 45 | 830 |
| Comp. E | Monoethylbiphenyl | −44 | 536 |
| Comp. F | Dimethyldiphenyl Oxide | −40 | 554 |
| Comp. G | Di-, Tri- and Tetraethyl-diphenyl Oxide | −49** | 550–750 |

TABLE I-Continued

Comparative Examples of the Components of the Base Fluids

| Example | Fluid | Freezing Pt., °F. | Boiling Pt., °F. |
|---|---|---|---|
| Comp. H | Ethylbenzene Oil*** | −13 | 625–750 |

*The eutectic mixture of diphenyl oxide and biphenyl containing 76.3 volume percent diphenyl oxide and 26.4% biphenyl.
**Very viscous — not a true freezing point.
***The higher boiling cut in the alkylation of benzene with ethylene in the presence of a Friedel-Crafts catalyst after mono- and diethylbenzene have been removed.

TABLE II

Mixtures of Di(phenoxyphenyl)Ether and Dowtherm A

| | Composition, Vol. % | | Freezing |
| Example | Polyphenyl Ether | Dowtherm A | Pt., °F. |
|---|---|---|---|
| 1 | 30 | 70 | −18 |
| 2 | 50 | 50 | −27 |
| 3 | 70 | 30 | − 4** |

**Very viscous — not a true freezing point.

TABLE III

Mixtures of Monoethylbiphenyl and Dowtherm A

| | Composition, Vol. % | | Freezing |
| Example | Ethylated Biphenyl | Dowtherm A | Pt., °F. |
|---|---|---|---|
| 4 | 30 | 70 | 10 |
| 5 | 50 | 50 | <−58 |
| 6 | 70 | 30 | −58** |

**Very viscous — not a true freezing point.

TABLE IV

Mixtures of Ethylbenzene Oil and Dowtherm A

| | Composition, Vol. % | | Freezing |
| Example | Ethylbenzene Oil | Dowtherm A | Pt., °F. |
|---|---|---|---|
| 7 | 30 | 70 | 30 |
| 8 | 50 | 50 | −33** |
| 9 | 70 | 30 | −36** |

**Very viscous — not a true freezing point.

TABLE V

Mixtures of Di-, Tri- and Tetraethyldiphenyl Oxide and Dowtherm A

| | Composition, Vol. % | | Freezing |
| Example | Ethylated Diphenyl Oxide | Dowtherm A | Pt., °F. |
|---|---|---|---|
| 10 | 25 | 75 | 21 |
| 11 | 50 | 50 | −1.5 |
| 12 | 75 | 25 | −50 |

In the same manner as shown for the heat transfer fluids above, methylbiphenyl and methyldiphenyl oxide are substituted for the third component to give a heat transfer fluid with a low freezing point and a broad range of liquidity.

Also, in a manner similar to the examples above, mixtures of at least two components selected from polyphenyl ethers, methylated biphenyl, ethylated biphenyl, methylated diphenyl oxide, ethylated diphenyl oxide and ethylbenzene oil are employed in combination with mixtures of diphenyl oxide and biphenyl to give a heat transfer fluid with a broad range of liquidity.

Also, heat transfer fluids are prepared having a different proportion of diphenyl oxide and biphenyl than the eutectic mixture. For example, fluids containing 80% diphenyl oxide, 5% biphenyl and 15% ethylbenzene oil; 25% diphenyl oxide, 50% biphenyl and 25% methylbiphenyl; and 40% diphenyl oxide, 10% biphenyl and 50% methyldiphenyl oxide are prepared and found to have desirable properties similar to the fluids above.

We claim:

1. A composition of matter, by volume, consisting essentially of about 30 to about 70% of di(phenoxyphenyl) ether, the remainder being essentially diphenyl oxide and biphenyl present in essentially the proportions of their eutectic mixture.

2. The composition of claim 1 consisting essentially of about 50% by volume of di(phenoxyphenyl) ether, the balance being the eutectic mixture of diphenyl and diphenyl oxide.

* * * * *